United States Patent [19]

Lary et al.

[11] Patent Number: 5,197,143
[45] Date of Patent: Mar. 23, 1993

[54] DEVICE AND METHOD FOR DISTRIBUTING INFORMATION IN A COMPUTER SYSTEM

[75] Inventors: Richard F. Lary, Colorado Springs, Colo.; William R. Bidermann, Sudbury, Mass.; Timothy E. Nerger, Colorado Springs; John C. Lyle, Manitou Springs, both of Colo.

[73] Assignee: Digital Equipment Corporation, Maynard, Mass.

[21] Appl. No.: 591,088

[22] Filed: Oct. 1, 1990

[51] Int. Cl.⁵ .............................................. G06F 12/00
[52] U.S. Cl. .................................. 395/425; 364/238.4; 364/260.1; 364/DIG. 1; 364/926.92; 364/DIG. 2; 395/725
[58] Field of Search ............... 395/425, 325, 725, 400, 395/275; 364/DIG. 1, 238.4, 260.1, DIG. 2, 926.92; 360/98.01

[56] References Cited

U.S. PATENT DOCUMENTS

| | | | |
|---|---|---|---|
| 4,453,211 | 6/1984 | Askinazi et al. | 395/500 |
| 4,600,990 | 7/1986 | Gershenson et al. | 395/425 |
| 4,607,328 | 8/1986 | Furukawa et al. | 395/250 |
| 4,805,090 | 2/1989 | Coogan | 395/275 |
| 4,825,406 | 4/1989 | Bean et al. | 395/275 |

Primary Examiner—Michael R. Fleming
Assistant Examiner—Glenn A. Auve
Attorney, Agent, or Firm—Arnold, White & Durkee

[57] ABSTRACT

A pipelined multi-staged logic control device for controlling the movement of information between a number of storage devices and a host computer. The pipelined multi-staged logic control device resides in a controller having a first and a second data bus wherein each of the data buses can access up to four drive ports. Information can flow through either of the data buses to any one of the eight total drive ports. A pair of identical integrated circuit chips are each coupled individually to a single state machine. Each of the integrated circuit chips act in concert with their associated state machine to examine the state of the drive ports and to decide if a requested drive port can be accessed. The present invention is extremely fast due to the use of state machines. While a pickup head is locating information on a storage device, other requests for information are checked during this time to determine whether additional requests can be satisfied during the pickup head's locate time.

10 Claims, 8 Drawing Sheets

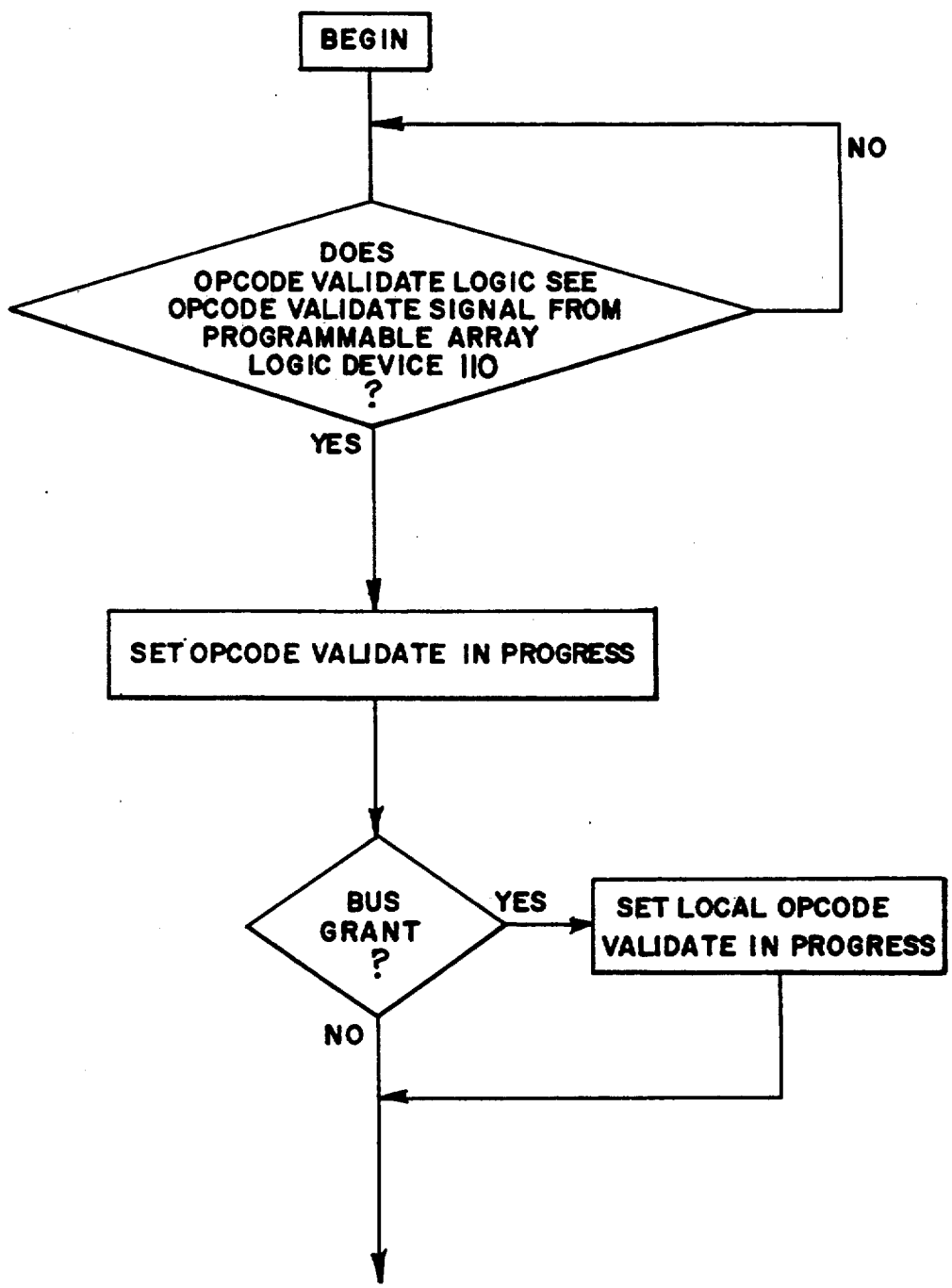
FIG_5A_

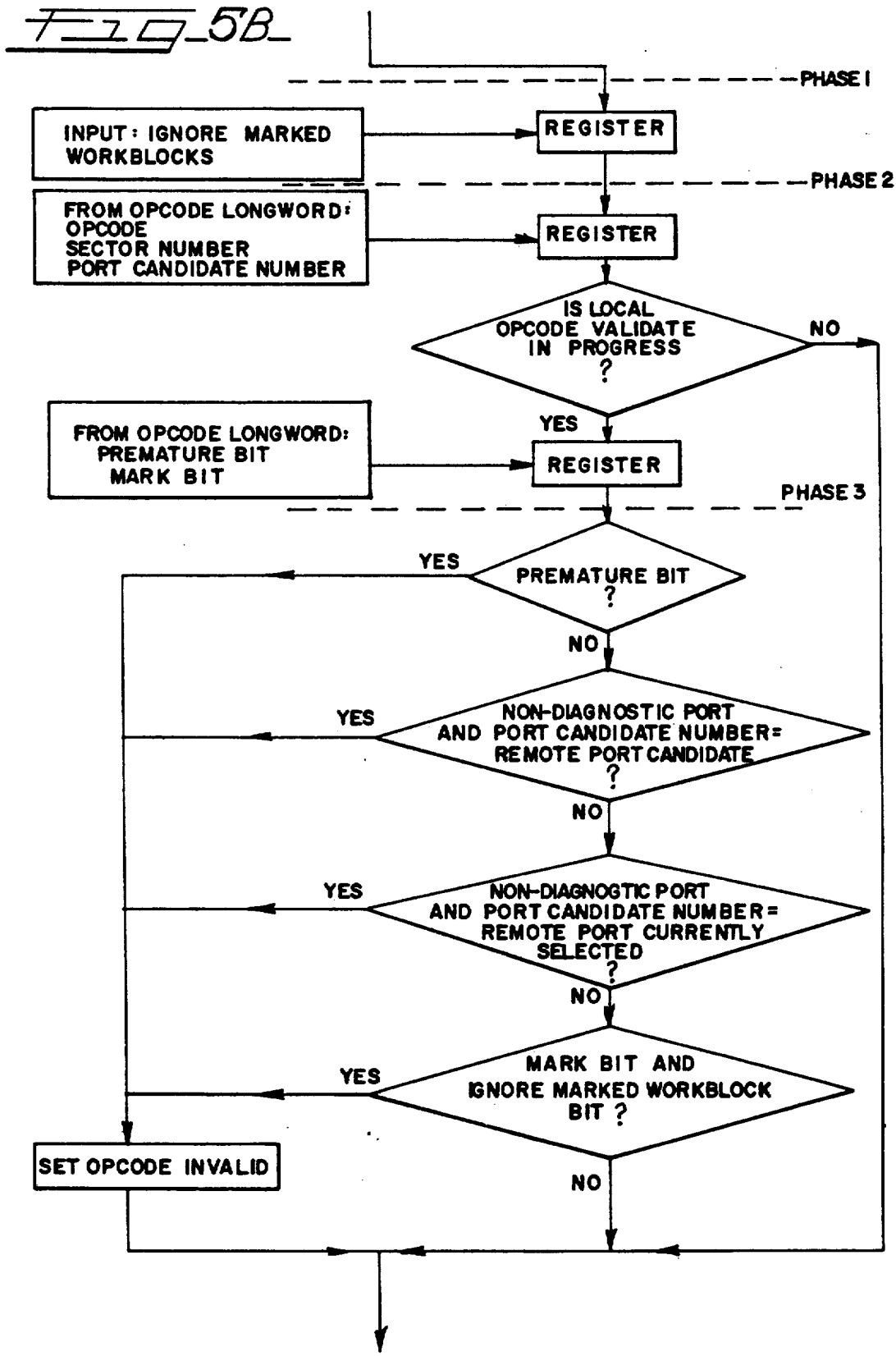

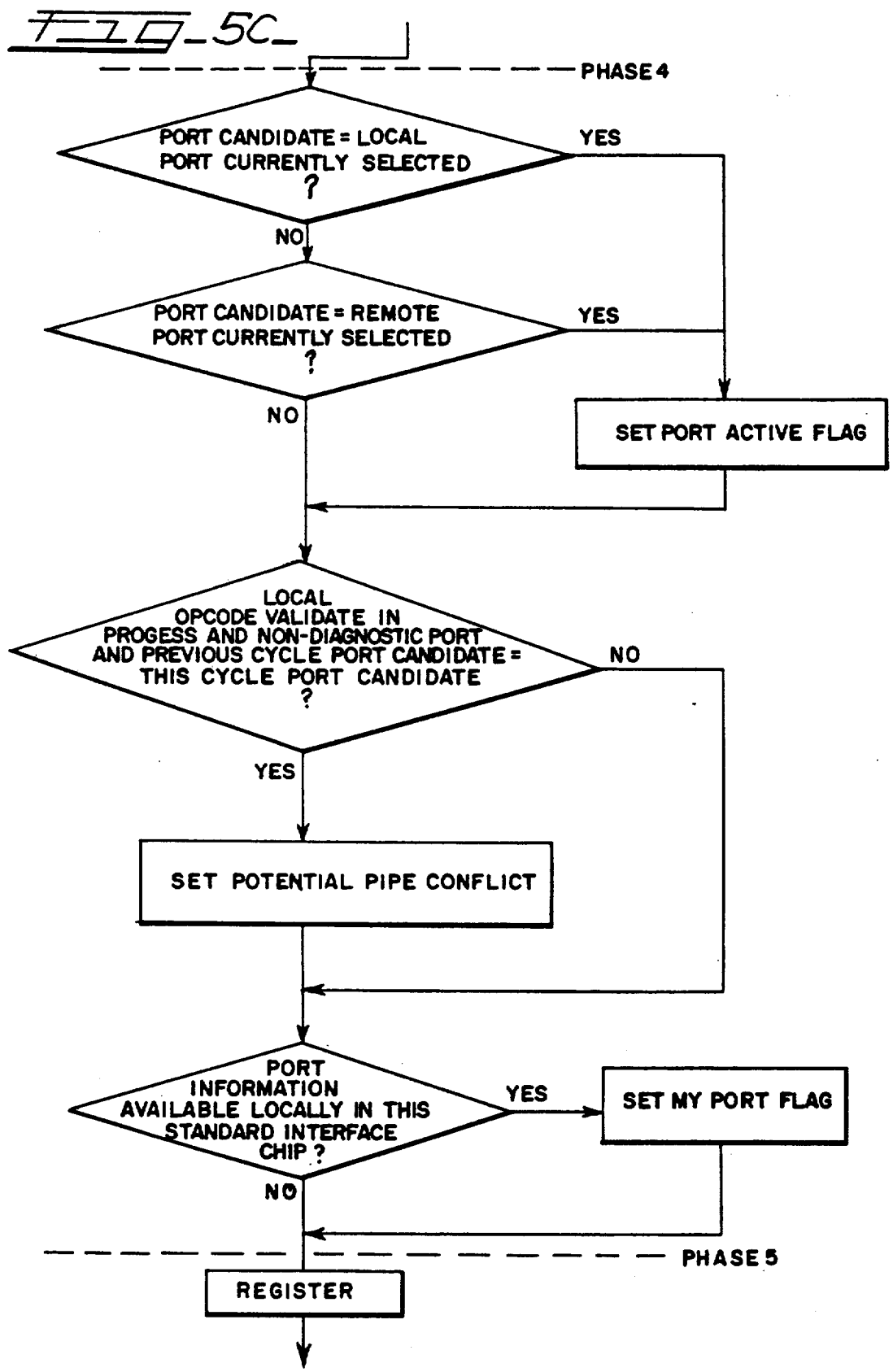

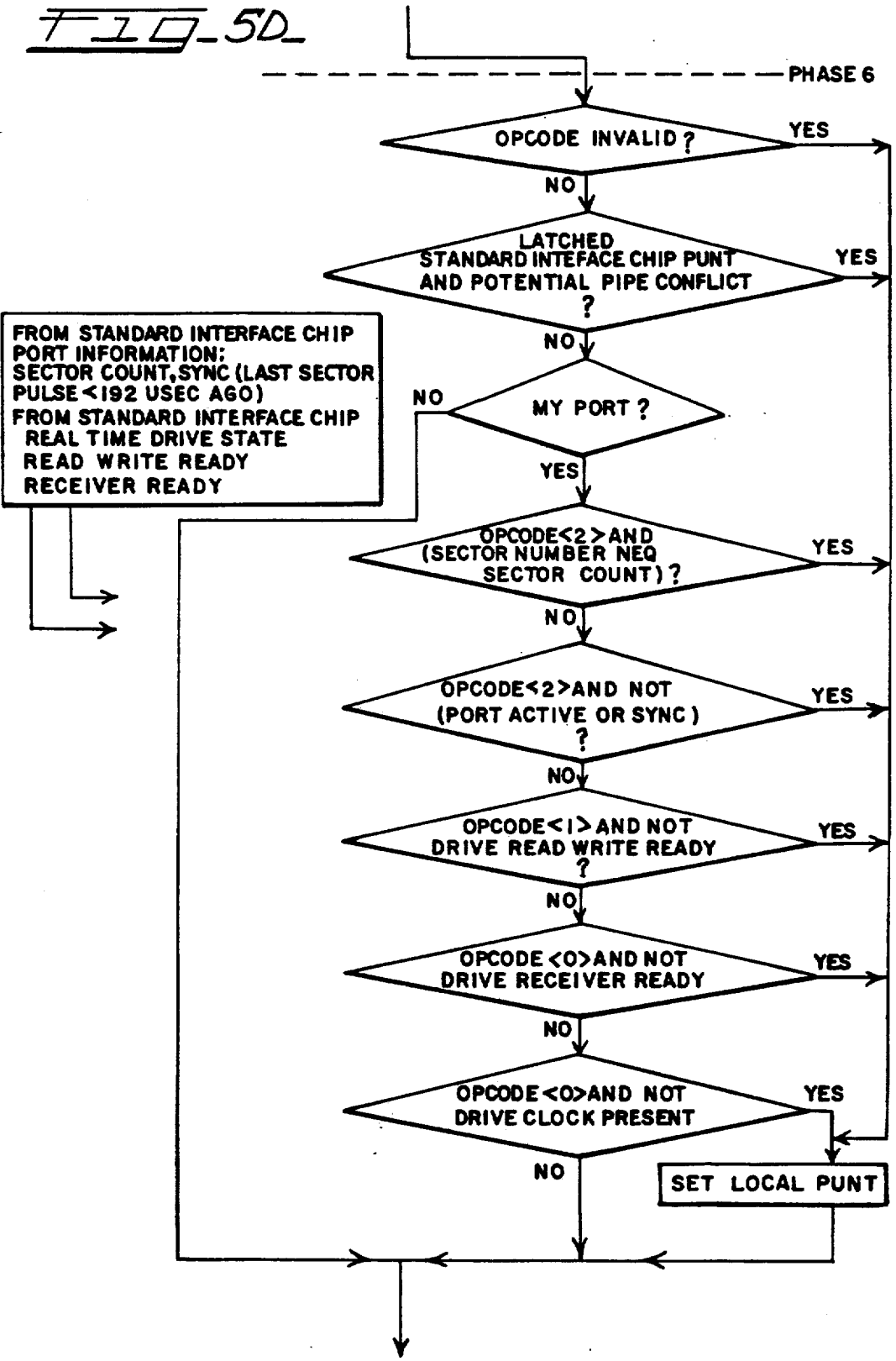

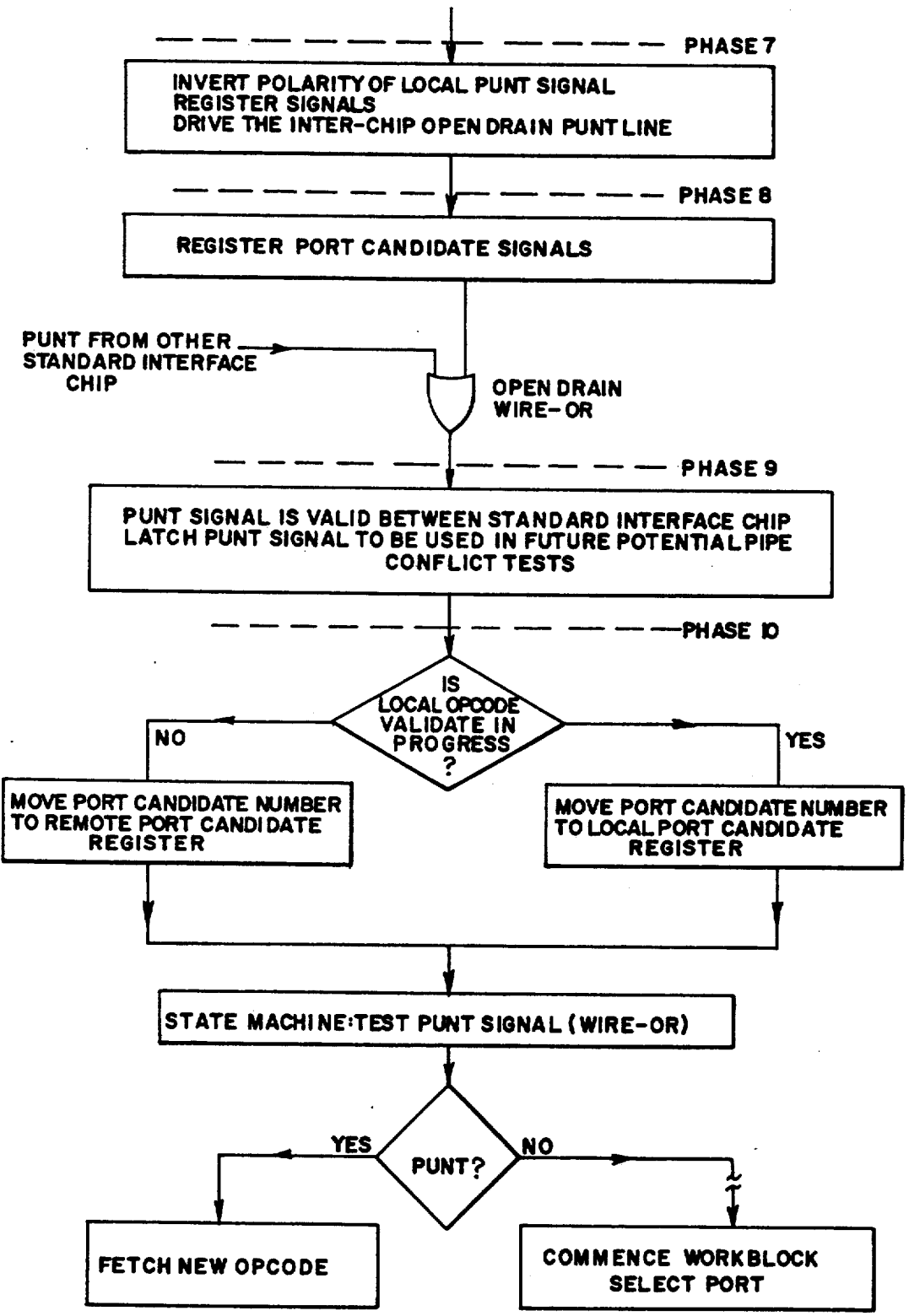

DEVICE AND METHOD FOR DISTRIBUTING INFORMATION IN A COMPUTER SYSTEM

FIELD OF THE INVENTION

The present invention relates to a pipelined multi-staged logic control device used to control the movement of information between a plurality of storage devices and a host computer Information moves through either a first or a second data bus included within a storage device controller resident within the host computer. More particularly, the invention relates to a pair of identical integrated circuits contained within the storage device controller which are used to select either the first or the second data bus for moving the information to one of a plurality of drive ports coupled individually to the storage devices A single state machine is coupled to each of the integrated circuits to enable the controller to utilize the search time required for finding information contained on one of the storage devices. A number of requested drive ports and the location of information requested thereby is examined along with the current addressing information of drive ports in use. The location of the information contained on the requested drive ports is then compared to current address locations of information currently being transferred. The multistaged pipeline logic determines how proximate the requested information locations are to the currently addressed locations. If the proximity is sufficiently close, the requested drive port is enabled, thereby reducing the time taken to locate the requested information.

BACKGROUND OF THE PRIOR ART

In a typical computer system, there may well be over a hundred users. Each of these users will typically access the computer system through the use of computer terminals. A variety of computer programs are used to create documents which include letters, memos, financial statements and spreadsheets. These documents are stored on a data storage device which can include a tape drive storage system, a disk drive storage system, and an electronic drive storage system consisting of large random access memory (RAM) arrays For purposes of illustration, the present invention will be discussed with reference to the disk drive type storage systems, however the present invention has equal applicability to the tape drive and electronic drive type storage systems. A storage device controller is used to direct the transfer of data between the computer and the storage devices The number of data transfer requests between the computer terminals and the data storage devices can number over a hundred requests per second.

The controllers of prior art systems typically had a single data channel connected to four dedicated drive ports used in isolation. Some controllers contained an additional data channel connected to four more dedicated drive ports. However, neither of the two data channels could communicate with the dedicated drive ports associated with the other data channel. If one of the drives in a group of four drives experienced long data transfer access times, the other three drives sat idle waiting for the transfer to be completed, since there was no way to transfer information to or from those drives through the other data channel if said other channel was not being used. Consequently, the data transfer rate between computer terminals and data storage systems suffered since oftentimes a data channel sat idle.

Data is transferred to and stored in an encoded digital format that is convenient and efficient for the computer system to understand. The storage devices have their own addressing scheme so that stored data can be accessed and retrieved when needed. In the disk drive storage system, the stored data is accessed by positioning a pickup head above a storage disk having a plurality of storage tracks of data recording space. On a hard disk, for instance, the disk has a plurality of concentric tracks wherein each track is identified by a number. Within one recording track, i.e., one revolution of the disk drive, are dozens of data storage address areas called sectors. Each sector has a unique address which indicates the location of the track and the sector number where the track is located.

The storage disk rotates at speeds of up to 3600 revolutions per minute. As fast as that may seem, the positioning speed of the pickup head in locating the correct address on the disk is slow compared to the speed of the controller in organizing the order in which the data is to be transferred to or from the disks. When information is being transferred to one particular disk drive at a specific address, a certain amount of time is required to locate the specific address A new transfer of data must wait until the data channel is free and the pickup head has located the proper information. In the time that it takes for the pickup head to locate the proper information, additional information could be transferred if the controller realized that additionally requested information was located on the disk at disk locations which are passed over by the pickup head as the pickup head travels to the originally selected location.

SUMMARY OF THE INVENTION

The present invention is a pipelined multi-staged logic control device for use in a disk, tape, or electronic controller having two data transfer channels Each channel includes an integrated circuit or logic chip having an operation code (opcode) validation logic which is responsible for monitoring the status of four drive ports connected directly to each integrated circuit. Either data channel, through its own integrated circuit, can transfer data to not only its own dedicated four drive ports but to any one of the other four drive ports as long as the selected drive port and data channel are open. Consequently, any two of the eight drive ports can be transferring data at the same time through the two data channels.

This feature allows not only the use of two data channels, but it also allows the controller to transfer information during the time it takes the pickup head to travel, for instance, from one sector of a disk to another sector. If the pickup head is on some sector and is scheduled to read or write information to some other sector, the invention will check any other commands which are waiting for execution to see if they can be executed on a plurality of intermediate sectors which are passed over by the pickup head as it travels to the other sector In this way, a type of rotational optimization of the disk is achieved by enabling the pickup head to access information which is requested and located on the intermediate sectors which would otherwise be passed over by the pickup head.

The two logic chips, acting in cooperation, arbitrate and validate the connection between either of the two data channels to any of the eight drive ports for distributing information thereto Each of the two logic chips are identical in structure and communicate with each other to monitor drive port status. The development of a single chip which when used twice produces economies of scale which would not be realized if two different chips were used. Each of the logic chips contains an identical copy of an opcode (operation code) validate logic. Part of the data identified by the opcode validate logic is derived from the current conditions or states of the drive ports. Each of the logic chips has dedicated drive status lines for four of the eight drive ports to indicate the drive port states. The drive ports are partitioned; four of the drive ports to one logic chip and four of the drive ports to the other logic chip. Data can and does, however, flow through either of the two logic chips to any of the eight drive ports.

The opcode validate logic determines if a workblock (workblocks are data structures which specify one of a plurality of drive commands that include data transfers between the controller and the data storage devices, i.e., tape, electronic or disk drives) can be executed on a drive port which has been designated by the computer or the controller. The workblock is comprised of a plurality of longwords (thirty-two bit words). The first longword of the workblock is a command longword containing four bytes or thirty-two bits. The command longword contains an opcode that defines the type of operation which will occur between the controller and the drive, the sector number and the drive port number of the designated drive port and a number of other control bits and flags of which some are used in the opcode validation process.

The two logic chips operate asynchronously, scanning a circularly linked list of workblocks called a workring for work which can be performed and has not already been performed. The controller is responsible for adding new workblocks to the workring and removing workblocks that have been performed.

The logic chip both asserts and responds to a shared logic signal to read and validate the command longword in conjunction with a longword read. This causes the opcode logic in the other logic chip to accept the command longword for opcode validation as well. Using the information encoded in the command longword, each of the logic chips' opcode logic determines possible drive port conflicts between drive ports which have been previously requested and newly designated drive ports requested by the other logic chip. The requests for the various drive ports are operated on in the order in which they are received. The logic delays involved in an opcode validation process are long enough that the opcode validation process must be implemented as a pipelined process in which the two logic chips operate independently. Since the two logic chips can request opcode validation cycles on successive bus cycles in any order, the port conflict logic must cross pipeline stages. A drive port conflict renders the opcode command inherently invalid so that it cannot force an operation to occur.

Further into the pipeline, the logic chips determine if the request for the selected drive port can finally be granted based on drive position of the selected storage device and data readiness. If the drive port is dedicated to the other logic chip, then the operation is called a remote operation and only inherent or potential drive port conflicts are sufficient for this logic chip to prevent an enabling of the selected drive port. If the drive port is dedicated to the same logic chip, the operation is considered to be local, and the port drive status, sector number, and other required signals also become a part of the opcode validate process. A final validation to enable the requested drive port requires the consent of both logic chips validation processes.

BRIEF DESCRIPTION OF THE DRAWINGS

FIGS. 5A-5E a flowchart indicating the steps followed during the course of an operation code validation process of the present invention.

DESCRIPTION OF THE INVENTION

Figure 1:
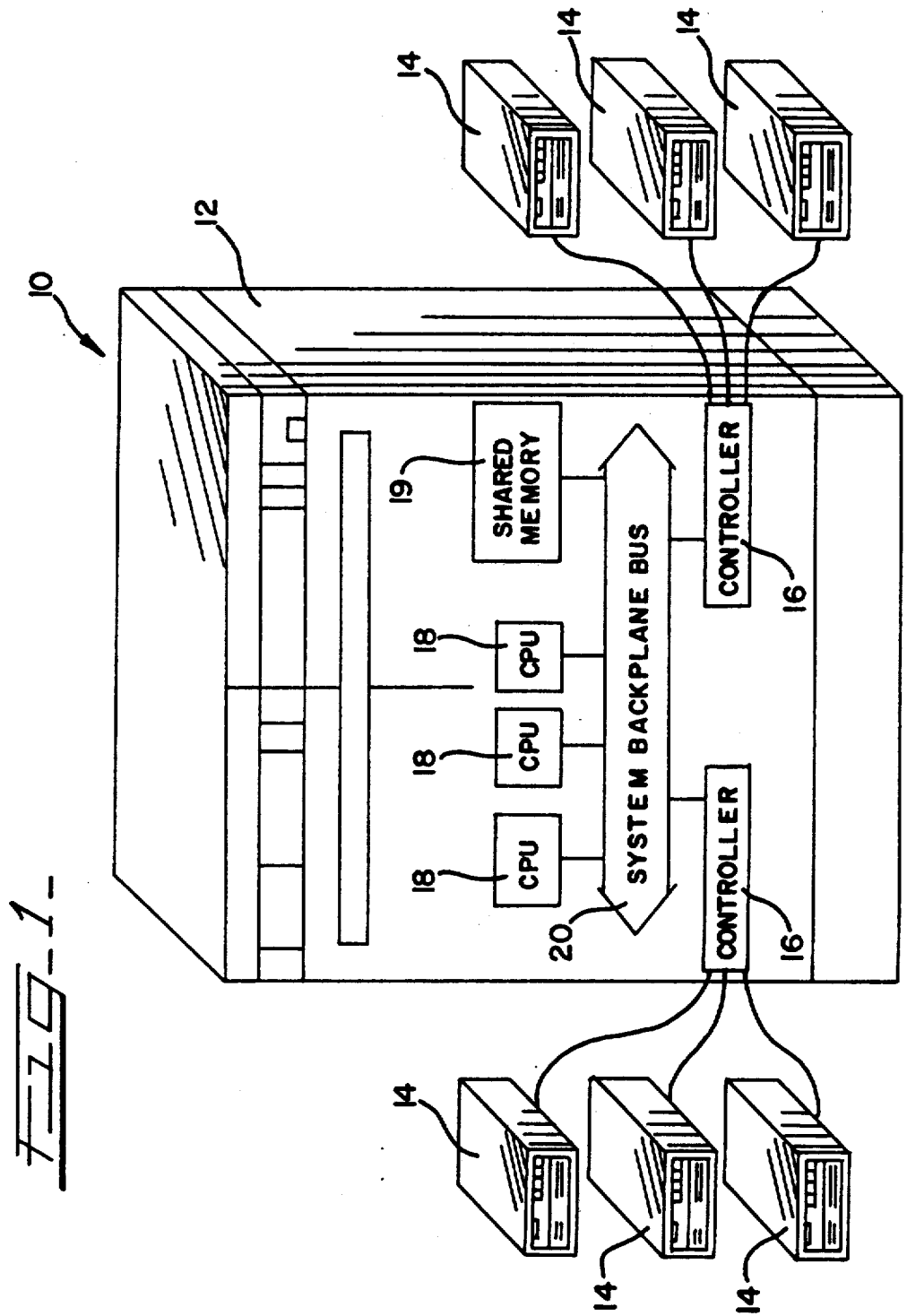
FIG. 1 is a block diagram of a computer system in which the present invention is used.

FIG. 1 illustrates a computer system 10 in which the present invention is used. The computer system 10 includes, for purposes of illustration, a host computer 12, a plurality of data storage devices 14 and a plurality of controllers 16 (the present embodiment can include up to eight storage devices per controller). The host computer 12 includes at least one central processing unit (CPU) 18 and a shared memory 19. The controller 16, the CPU's 18, and the shared memory 19 are coupled by and communicate through a system backplane bus 20. The storage devices 14 can include disk drive type storage devices, tape drive type storage devices and electronic drive type storage devices.

The computer system 10 in which the present invention is employed contains one or more of the controllers 16. The controllers 16 are coupled to each of the storage devices 14 by a number of radial information transmission lines not shown but understood by one skilled in the art. Data and commands are communicated between CPU's 18 and the controllers 16 in both directions by control blocks located in the shared memory 19 which is accessible by the system backplane bus 20 as would be understood by one skilled in the art. The controllers 16 are used to multiplex streams of commands and data between each of the CPU's 18 and the plurality of data storage devices 14. The controllers 16 monitor the operations of the data storage devices 14 and the CPU's 18 to which said controllers are coupled and direct the flow of information between the data storage devices 14 and the computer system 10.

The present invention can also be used in a computer system 10 in which one or more of the computers is of the type which doesn't contain a controller within the host computer 12 as illustrated here, but utilizes a controller external to the computer as would be known by one skilled on the art.

The controller 16 in which the present invention is used sends and receives commands and data from the CPU's 18 to which said controller is coupled as shown in FIG. 1. The controller 16 for which the present invention has applicability works equally as well for the control of disk and tape drives. The controller 16 has two data transfer channels and eight connections or eight drive ports for connecting the two data transfer channels to eight data storage devices The present embodiment is directed to control of eight or less drive ports. The basic operation of the controller 16 is to direct and transfer data between the user terminal of the computer to a selected storage device where the data is stored.

As is well understood in the art, the controller 16 incorporates a number of logical circuits to monitor the states of the various storage devices and the commands from the host computer 12 to which it is coupled so that the transferral of the information flowing between the host computer 12 to which it is coupled and the storage devices 14 can be made at the proper time and in the proper sequence. To accomplish this transferral of information, the logical circuits communicate with each other over an internal communication bus 30 (seen in FIG. 2) which carries internal command, internal addressing information, and data. The multistage pipeline logic circuitry of the present invention also uses the internal communication bus 30 to communicate with the other logical circuitry of the controller 16 to direct information to be moved between memory and the eight storage devices over the internal communications bus.

Figure 2:
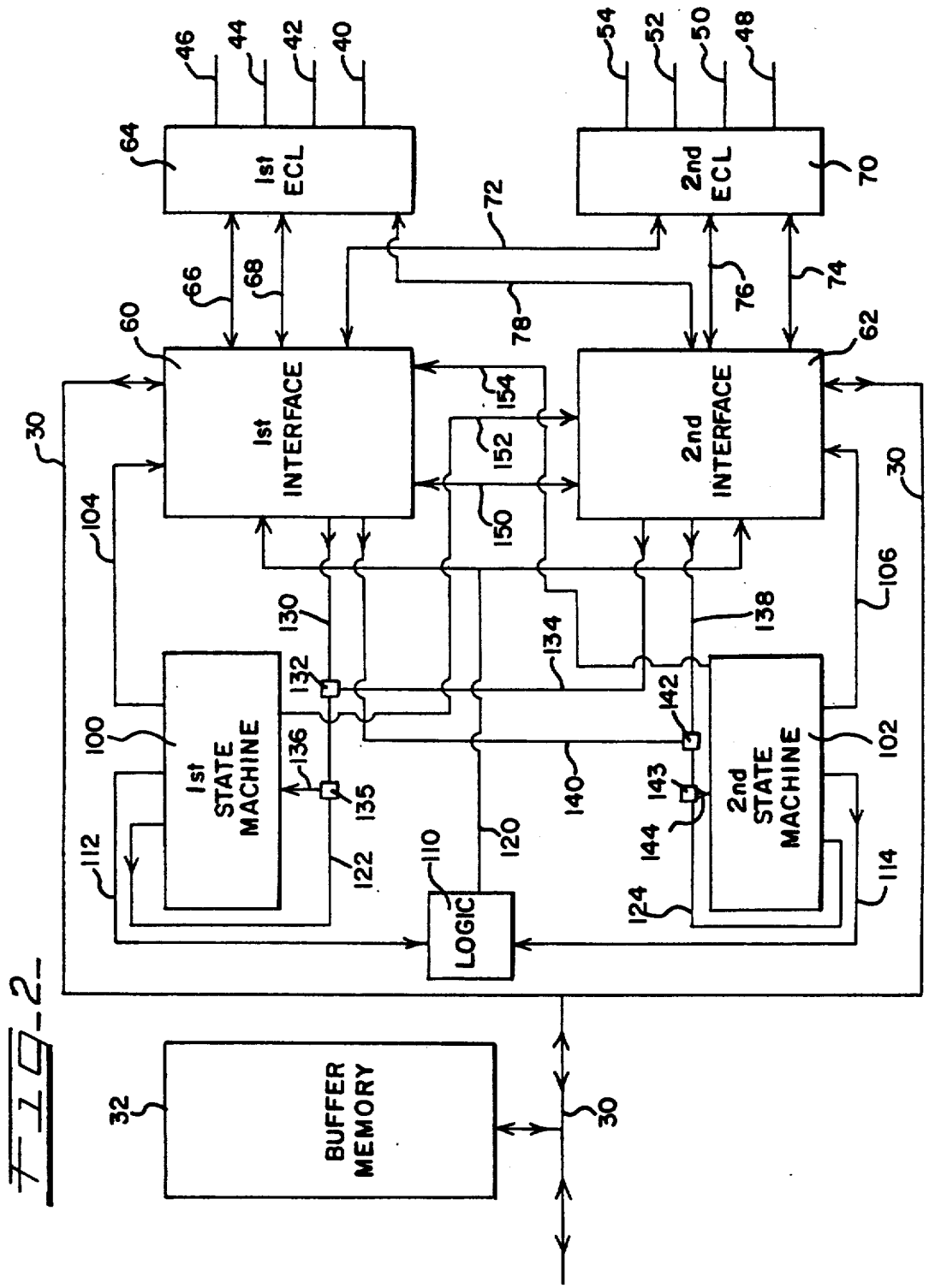
FIG. 2 is a block diagram of the multi-staged pipeline logic circuitry of the present invention.

FIG. 2 illustrates a block diagram of the present invention and the internal communication bus 30 of the controller 16. The internal communication bus 30 of the controller 16 is a synchronous bus having a bus cycle which begins with the rising edge of every bus clock as would be understood by one skilled in the art. The bus clock operates at five MHz and is derived from a twenty MHz clock resident in the controller. The falling edge of the twenty MHz clock is coincident with the rising edge of the bus clock in the present embodiment Both of these clocks are used by the operational code validation logic to establish an internal four phase clock in which each phase is active high for fifty nanoseconds.

The internal communication bus 30 includes a thirty-two bit data bus plus four bits of byte wide parity (thirty-six total bits), an eighteen bit address bus and a six bit control bus consisting of four byte masks, one read/write signal and one memory select line indicating memory space versus input/output space as would be understood by one skilled in the art. The internal communications bus 30 is coupled to a buffer memory 32 included within the controller 16. The buffer memory 32 contains workblocks and commands which are requests for access to the plurality of data storage devices used by the present invention to determine port availability.

The multi-staged pipeline logic circuitry is contained within two data channels. The multi-staged pipeline circuitry arbitrates and validates the access of either of the two data channels to any of the eight drive ports of which four can be found on each data channel. The first channel contains a first port 40, a second port 42, a third port 44 and a fourth port 46. The second channel includes a fifth port 48, a sixth port 50, a seventh port 52, and an eighth port 54. Each of these ports contains four sets of co-ax cable. Two of the cables are control lines which are used for sending and receiving command data to and from the storage device and the data channel. One of the two sends command data to the storage device, while the other sends information indicating the operating state of the storage device to the data channel to inform the data channel, including the pipeline logic circuitry, of the state in which the storage device is currently operating. The other co-ax lines are data lines which are used for sending data to and from the controller and the storage devices as is well known in the art.

The internal communications bus 30 is also coupled to a first standard interface chip 60 and a second standard interface chip 62. The pipeline control logic of the present invention is contained in these two identical integrated circuit chips. The first standard interface chip 60 is included in the first channel and the second standard interface chip 62 is included in the second channel. Each of these standard interface chips 60 and 62 are complementary metal oxide semiconductor (CMOS) very large scale integrated (VLSI) chips although other types of semiconductor logic can be used. Each of the first and second standard interface chips 60 and 62 perform all the data transfers to and from the controller 16 and the plurality of storage devices 14 and contain the opcode logic referenced in this invention.

The first standard interface chip 60 is coupled to a first standard interface emitter coupled logic (ECL) chip 64 through a first data line 66 and a first control state line 68. The first data line 66 is used to transmit data between the first standard interface chip 60 and the first standard interface ECL chip 64. The first control state line 68 is used to transmit control state information which is found on the storage devices 14 coupled to their respective drive ports 40, 42, 44, and 46 as previously described. The first standard interface chip 60 is also coupled to a second standard interface ECL chip 70 by a first opposite channel data line 72 which is used to transmit information from the first data channel out through the drive ports 48, 50, 52, and 54 coupled to the second data channel.

The second standard interface chip 62 is coupled to the second standard ECL interface chip 70 by a second data line 74 and a second control state line 76 whose function is the same as the first control state line 68 described for the first channel except the second control state line 76 is for ports 48, 50, 52, and 54. The second standard interface chip 62 is also coupled to the first standard ECL interface chip 64 by a second opposite channel data line 78 for transmitting information from the second data channel out through the drive ports 40, 42, 44, and 46 coupled to the first data channel.

The purpose of the standard interface ECL chips 64 and 70 is to convert electrical impulse signals coming from the data storage devices into nonreturn to zero (NRZ) signals (encoded binary signals that aim to achieve the highest possible data transfer rate for a given signal frequency) so that the transistor-transistor (TTL) logic used in the present controller can recognize information from the storage device and convert it into digital logic signals as would be understood by one skilled in the art.

The first and second standard interface chips 60 and 62 receive command information which travels through the internal communication bus 30. The logic circuitry that determines if a given command can be executed without conflicts is contained within these two standard interface chips 60 and 62, each one of which cooperates with a first and second state machine 100 and 102 respectively. Each of the first and second state machines 100 and 102 are identical in structure and consist primarily of a control random access memory (RAM) containing microcode comprised of a plurality of microwords as would be understood by one skilled in the art. The microcode controls the operation of the circuitry in the standard interface chips 60 and 62. The microcode contained in the first state machine 100 controls the standard interface chip 60 and the microcode in the second state machine 102 controls the standard interface chip 62. The standard interface chip and its corresponding state machine cooperate to arbitrate and validate the transfer of information through the drive ports.

As microcoded state machines are well known in the art, the function of the state machine will be described only sufficiently to indicate its operating relationship with the its companion standard interface chip. In general, state machines perform specialized tasks and do not manipulate data structures nor do they perform arithmetic functions. They have limited memory addressing capability, and no interprocessor communication ability. They essentially react to an input which can, for example, correspond to a state of a disk, by responding with a series of preprogrammed instructions contained within the microcode contained in RAM. Because they do not perform any arithmetic or functional calculations, they are very fast devices and operate well with the standard interface logic chips of the present invention.

In general, commands are fetched by the data channels over the internal communication bus 30 in a series of longwords called a workblock. A workblock is a structure which causes a state machine to perform an action or a task. Some tasks which the workblock can perform might include write to a disk, read from a disk, read from a tape, write to a tape, initialize a disk, tape, or electronic drive and a variety of other tasks which are known by those skilled in the art. The workblock used by the present embodiment consists of eight thirty-two bit words. The first word is an operational code word or command longword which contains an operation code that defines the type of operation between the controller and the drive, the sector number, the port number of the designated drive, a data availability flag, and other control bits and flags.

The highest level data structure that a state machine uses is called a workring. The workring consists of a plurality of ring leaders. Each ring leader is a longword which points to a worklist, where a worklist is a linked string of workblocks which are operated on to perform a particular set of order dependant tasks. The worklist can consist of any number of workblocks, even one, the number being dependent on how many workblocks it takes to perform a particular set of tasks.

State machines use workrings to schedule multiple independent sequences of order-dependent events. The worklist represents the sequences of order-dependent events, and the collection of ring leaders corresponds to the order-independent scan list of event sequences. Basically, each of the standard interface chips in cooperation with its respective state machine will start scanning a worklist looking for a workblock to execute.

In the time that it takes a disk to advance a single sector, each data channel will check all workblocks in the workring to see if the data channel finds a command that could be executed given the current status of all the disk drives.

The first standard interface chip 60 is coupled to the first state machine 100 by a first control bus 104 which is used to move control information between the state machine and the standard interface chip. The second standard interface chip 62 is similarly coupled to the second state machine 102 by a second control bus 106 for the movement of control information.

The first and the second state machine are coupled to a bus control programmable array logic device 110 and to diagnostic registers which coordinates a bus grant and provides diagnostic and calibration control for the first and second channel as would be understood by one skilled in the art. The first state machine 100 is coupled to the bus control programmable array logic device 110 through a first opcode request line 112 and the second state machine 102 is coupled thereto through a second opcode request line 114 for the same purpose. The control programmable array logic device 110 is also coupled to the first and the second standard interface chips 60 and 62 through an opcode validate line 120 which carries an opcode validate signal to be described later in greater detail.

A first next address line 122 is used by the first state machine 100 to carry next address information as feed back information back to the first state machine 100. The first next address line 122 couples an output address section of the state machine to an input address section of the state machine to deliver next address information as would be understood by one skilled in the art. A second next address line 124 is used in the same fashion by the second state machine 102 for the same purpose. Each of the first and the second next address lines 122 and 124 are parallel buses which are eleven bits wide in this embodiment.

The first and second standard interface chips 60 and 62 communicate information to both of the first and second state machines through test multiplexer lines. The test multiplexer lines are capable of modifying the next address lines of the state machines, in this way effecting the next microcode word to be executed. The test multiplexer lines are three bits wide in this embodiment. The first state machine 60 is coupled through a first test line 130 to a multiplexor function located at a first point 132 which also receives information from the second standard interface machine 62 through a second test line 134. The output of the multiplexor function, located at the first point 132 resulting from the information carried over the first and second test lines 130 and 134 is connected to an OR device at point 135. The OR device at point 135 couples the result of the multiplexor function at the first point 132 and the next address line 122 to the first state machine through a first state machine input 136 to form the memory location of the next microcode instruction.

The second state machine similarly receives information from the first and second standard interface machines 60 and 62 over a third test line 138 and a fourth test line 140 input to another multiplexor function located at a second point 142. The output of the multiplexor function at the second point 142 is input to the second state machine 102 through an OR device at point 143 using a second state machine input 144.

Both of the first and second standard interface chips 60 and 62 are identical in structure, however their operation will be slightly different depending on which of the two state machines 100 or 102 initiates or begins the validation cycle which determines whether a designated port can be accessed. In operation, each of the standard interface chips included within their respective channels are responsible for monitoring the status of their own four drive ports and for indicating through the use of a single signal, called PUNT, the status of the requested drive port, so that a combined decision is made by both the first and the second standard interface chips 60 and 62 indicating whether the requested port can be accessed by either of the data channels. The PUNT signal is an open-drain wired-AND; if either chip pulls it low ($\emptyset$), the result is a low ($\emptyset$) signal so that either of the first or second standard interface chips 60 or 62 can pull it low to indicate that the workblock cannot be executed, or, more simply, "PUNT this workblock". If neither chip pulls the signal low the operation specified by the workblock will be executed.

The first and the second standard interface chips 60 and 62 communicate this information over a PUNT line 150 which couples the two interface chips together. The first state machine 100 communicates port select information through a first port select enable line 152 to the second standard interface chip 62. The second state machine 102 communicates port enable information to the through a second port select enable line 154.

The standard interface chip first prompted by its corresponding state machine to begin a validation process is called the local standard interface chip and said local standard interface chip performs a local opcode validation cycle. The standard interface chip which is not associated with the state machine beginning the opcode validation cycle is called the remote standard interface chip and its operation is called the remote opcode validation cycle. The local standard interface chip cannot directly monitor the state of the drive ports coupled to the remote standard interface chip. The remote standard interface chip monitors its own four drive ports (now called the remote drive ports), and only indicates the state of one of the remote drive ports through the PUNT signal if the requested port is one of those remote ports.

Figure 3:
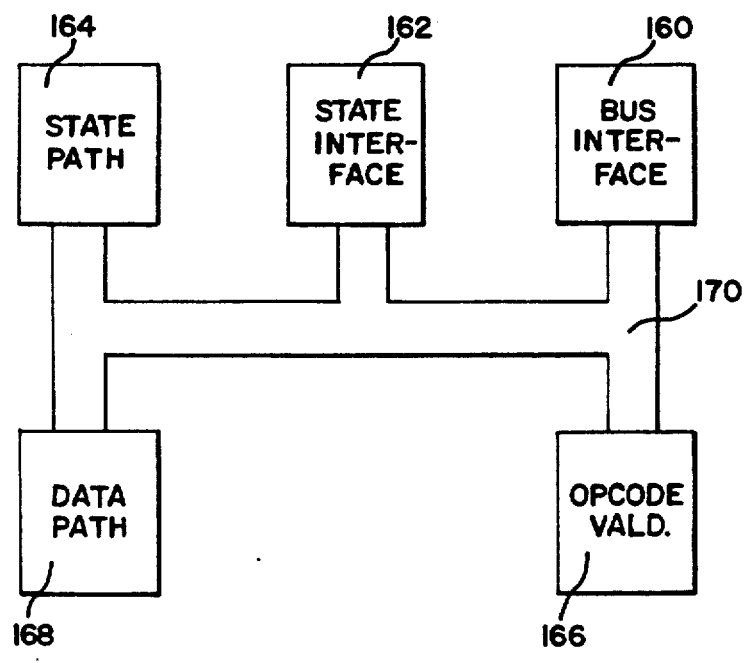
FIG. 3 is a block diagram of the sections of a standard interface chip of the present invention.

The first and second standard interface chips 60 and 62 are divided into five major sections as illustrated in FIG. 3. These sections include the bus interface section (BIF) 160, the state machine interface section (MIF) 162, the statepath section 164, the opcode validation section 166, and the datapath section 168. These five sections or logic blocks communicate over a thirty-two bit internal data bus (DBUS) 170.

The BIF 160 controls all address and data transactions between the standard interface chip and the internal communication bus 30 of the controller 16. This includes controlling the movement of data in the internal DBUS 170. The BIF 160 also provides access control signals. The implementation of the state machine's control register is shared between the BIF 160 and the MIF 162. The BIF 160 contains part of a transfer state machine which is used to sequence serial operations in the datapath section 168.

The MIF 162 decodes the microword sent by the state machine and sends the information to the other sections in the first standard interface chip by means of addressable bits and flags and a control bus within the state machine. Part of the state machine's control register is found in the MIF 162. The MIF 162 also generates three bits of next address information via the test multiplexer lines for the state machine by multiplexing signals from throughout the standard interface chip. The next address information is sent to the first state machine 100 via the first test line 130 and to the second state machine 102 via the third test line 138.

The statepath section 164 monitors and maintains the state and sector information of four disk/tape drives and provides this information to a port status register, the opcode validation section 166, the state machine cooperating with the standard interface chip, and the other state machine 102 via a remote test multiplexer, as would be understood by one skilled in the art, available in the statepath section 164. The statepath section 164 also provides the handshaking required by the various interface specifications for all disk/tape operations.

The datapath section 168 transfers data between the internal DBUS 170 and the storage devices 14. The data path section 168 contains error correction circuitry, header compare logic, a sync pattern detector, a constants ROM, and a plurality of first in first out (FIFO) buffers between the parallel and serial data paths as would be understood by one skilled in the art. The transfer state machine is shared with the BIF section 160 and is used to control the serial operations in the datapath section 168.

The logic contained in the operation code validation section 166 determines if a storage device operation can be executed by the standard interface chip. The details of opcode validation will be explained in greater detail later on. The PUNT signal is generated and monitored in an operation code validation section 166 for communicating the operation code valid status between the first and second standard interface chips 60 and 62.

A typical command will transfer data between a mass storage device and data memory in the controller as would be understood by one skilled in the art. This transfer requires that the mass storage device is ready for the data to be transferred to the specified sector. For each of the commands which the state machine has examined, the standard interface chips check the requested drive port to see if it is currently in use. If the command is requesting a drive port which is in use, then a conflict exists. If a conflict or a potential conflict (to be described later in more detail) exists based on the validation code read from the first longword of the workblock, then the standard interface chip detecting the conflict asserts the PUNT signal which indicates that the particular drive cannot be accessed at that particular time. The logic that determines if a given command can indeed be executed without conflicts is contained in the opcode validation section 166 of the first and second standard interface chips 60 and 62. At any one time, only one port on each of the first and second standard interface chips 60 and 62 can be active. The logic for selecting and enabling one of the selected ports is also contained within the opcode validation section 166.

Typical commands transfer data between one of the mass storage devices 14 and the controller data memory. This requires that the storage device is ready and in position for the data transfer of information to the specified sector. For each command, the standard interface chip which owns the port, checks the status and sector position of the drive on the designated port and generates the PUNT signal if the drive on that port is not ready to execute the command.

As previously described, two clocks are used by the operation code validation logic to establish an internal four phase clock. The falling edge of the twenty MHz clock, in the present embodiment, is coincident with the rising edge of the bus clock. Both of these clocks are used by the first and second standard interface chips 60 and 62 to establish an internal four phase clock as would be understood by one skilled in the art. Each phase of the four phase clock is active high for fifty nanoseconds. The clock phases are called phase one, phase two, phase three, and phase four wherein phase one occurs at the rise of five MHz bus clock.

The opcode validation process does not complete in a single cycle. One reason for this is that the disk status information for the port referenced by the current command is not available to the opcode validation section 166 until almost one cycle after the command has been read. Since it takes more than one cycle for the process to reach completion, and a second opcode validation could be started by the other state machine on the very next cycle, the opcode validation process is pipelined.

The port selection process also takes more than one cycle to complete and it is therefore also pipelined. Since the state machine microcode determines when and how long a port should be selected, the port selection pipeline is decoupled from the opcode validation pipeline. Decoupled means that the port selection pipeline starts on a signal that is indirectly derived from the opcode validation process. Because of this, the port selection process does not begin before the end of the opcode validation pipeline.

Figure 4:
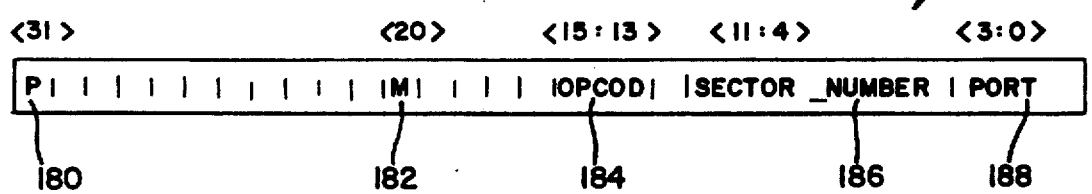
FIG. 4 is an illustration of an opcode longword as used in the present invention.

Each standard interface chip independently scans the workring for workblocks which it can execute. Reasons that a workblock may not be executed can include: the workblock has already been completed, a port conflict exists, or it is too early to begin processing that particular workblock. The first of the state machines to read the command longword of a candidate workblock asserts through the use of the bus control programmable array logic device 110, the opcode-validate signal while reading the candidate workblock command. The programmable array logic device 110 synchronizes this opcode-validate signal with the granting of the internal communications bus 30 and returns the synchronized opcode-validate signal to both standard interface chips 60 and 62. The synchronized opcode-validate signal initiates the opcode validation process on both of the standard interface chips. The standard interface chip that initiates the opcode-validate signal reads the entire 32 bit command longword while the other standard interface chip reads only the lower 16 bits of the command longword. FIG. 4 illustrates the command longword 178 used in the present invention.

The command longword contains 32 bits numbered right to left from zero to thirty-one. The premature bit 180 is located at the thirty-first bit location. Any command longword that has the premature bit 180 set is not yet ready for execution due to external circumstances that are not visible to the opcode validation section 166. For example, the controller may not yet have valid data for a disk write.

A marked bit 182 is located at the twentieth bit location. The marked bit 182 provides a mechanism for selectively disabling or enabling a whole group of queued workblocks.

Bit locations fifteen through thirteen contain a three bit word called an opcode 184 which indicates what type of operation the controller 16 is requesting for one of the selected storage devices to perform.

A sector number byte 186 consists of eight bits located at the eleventh to the fourth bit location. The sector number byte 186 indicates which sector number of the disk needs to be located. A port candidate number 188 contains four bits located at bit locations three through zero of the command longword. The port selector 188 indicates the desired port. The bit at location three indicates whether it is a diagnostic or a real port operation.

Opcode validation has two independent components: validation of the operation (necessary data is present, no port conflicts exist) and validation of the port (necessary signals are asserted, sector position is correct). The standard interface chip which asserted opcode-validate performs the operation code validation, while the standard interface chip which owns the port referenced by the command performs the port validation. Depending on the selected port, these two validations could be performed on the same standard interface chip or on different standard interface chips. If either validation fails, the responsible standard interface chip asserts the PUNT signal which is an active-low open-drain signal at a fixed time relative to the original assertion of opcode-validate, and both standard interface chips know that the workblock will not be executed. If neither of the standard interface chips asserts the PUNT signal, both of the standard interface chips know the workblock will be executed.

Because the two standard interface chips scan the workblock independently, and because the opcode-validate process takes longer than one bus cycle, the opcode-validate process is pipelined. An important part of opcode-validation is detecting port conflicts (attempts by the two standard interface chips to initiate the same workblock, or different workblocks on the same port). This mutual exclusion is possible because the opcode-validation process informs each standard interface chip of the next port which the other standard interface chip intends to use. The port select enable lines running between the standard interface chips and the other data channels' state machines are used to indicate when the standard interface chip actually starts (rising edge) and stops (falling edge) using the port of the previously validated opcode. Each standard interface chip thus keeps track of which port the other standard interface chip is using and which port it has validated for future use, and can detect conflicts even when two opcode validate cycles occur in successive cycles on the memory bus.

In order to allow the first standard interface chip 60 and the second standard interface chip 62 to check on actual and potential conflicts involving a port selected on the other standard interface chip, each of the standard interface chips maintains a local copy of the registers that indicate the port number that is currently selected by each chip as well as the port number that will be selected by each chip as soon as the microcode sends the go-ahead signal as would be understood by one skilled in the art.

The length of the operation code validate logic pipeline is 10 clock phases. If the start of the opcode pipeline occurs in the first phase, then in the tenth phase, each of the opcode validation logics loads its appropriate register with the port number referenced by the command, provided that neither of the opcode validate logic sections rejects the port request command.

When the state machine that initiated opcode validation on a port actually selects that port, then the local port selection pipeline is started and in the fourth phase of the local port selection pipeline each of the standard interface chips 60 and 62 loads a LOCAL PORT SELECT or a REMOTE PORT SELECT register respectively. The LOCAL PORT SELECT register is driven out through chip pins to the respective standard interface ECL chips, which are actual port interfaces that are coupled to the data storage devices 14 as would be understood by one skilled in the art. The standard interface ECL chips require that the select lines be stable before a port is really enabled, therefore the enable signal is further delayed until the eighth phase of the local port selection pipeline.

The microcode contained within the standard interface chip decides how long a port should remain enabled. Therefore, the port selection does not actually end until explicitly signaled. Since port selection start and end events are mutually exclusive and strictly alternate, they are encoded as transitions on one signal as opposed to levels on two signals.

The entire opcode validation section 166 is totally synchronous to the phase clocks. All edge-triggered devices are purposely avoided, therefore a signal transition is determined by checking if the level of a signal is different from the value it had four phases ago. This approach provides insurance against glitches, and it is used in the present embodiment. As further insurance, most inputs and outputs of the opcode validation section 166 are locally latched.

FIG. 5A-E a flow chart illustrating a step by step description indicating the decision making process of the opcode validation section 166 of the standard interface chip for a single opcode validation cycle. During actual operation, up to two opcode validation processes can be proceeding simultaneously at different stages of completion; the nature of the relationship of phases and bus cycles implies that any two such simultaneous processes be a multiple of four phases apart in the pipeline. Since four phases corresponds to a single cycle of the bus clock, the phases are shown in the flow chart to indicate which phase the opcode validation cycle is currently in.

The bus control programmable array logic 110 responds to the state machine request to read the command longword 178 by issuing a bus grant signal, as would be understood by one skilled in the art, to the standard interface chip supporting the state machine requesting the fetch, and by issuing the opcode validate signal to both of the standard interface chips. The opcode validate signal indicates to the standard interface chips that an opcode validation process has begun. The standard interface chips test the bus grant signal (one per state machine/standard interface chip) to determine if the opcode validation process supports the state machine controlling the workblock registers (local opcode validation) or supports the other state machine (remote opcode validation). The opcode validate logic sets opcode validate in progress bit indicating that an opcode validation process is in progress, and additionally sets a local opcode validate in progress bit if the process is local to the connected state machine.

Phase 1 of the bus clock begins on FIG. 5B. In Phase 1, a signal called Ignore Marked Workblock is read by the standard interface chip. The signal Ignore Marked Workblock is set by the CPU in a register of the standard interface chip. Ignore Marked Workblocks is a signal indicating that marked workblocks should not be executed for other reasons which can include the controller requesting to initialize one of the drives or to determine the status of one of the drives.

In Phase 2, the command longword 178 is latched from the internal DBUS 170. The opcode 184, the sector number byte 186, and the port candidate number 188 are all read. The standard interface chip then checks the local opcode validate in progress bit to determine if the standard interface chip reading this information is going to do a local or a remote opcode validation.

If the standard interface chip is going to do a local opcode validation, the local standard interface chip then latches the premature bit 180 and the mark bit 182 from the internal DBUS 170.

In Phase 3, the local standard interface chip sets an opcode invalid bit if any of the following tests are true:

1. The premature bit 180 is set. This condition indicates that all of the data required for the specified command is not yet available.

2. The port candidate number 188 is a nondiagnostic port and is the same port as the remote port candidate. A match would indicate that a remote opcode validation cycle has occurred previously on the current port candidate and that the second state machine is in the process of selecting the port.

3. The port candidate number 188 is a nondiagnostic port and is the same port as the remote port currently selected. Only one state machine may communicate with a port at a time.

4. The mark bit 182 and the Ignore Marked Workblock bit are both set. This indicates that the CPU does not want the local state machine to execute the command currently in the opcode validation process.

In Phase 4, shown on FIG. 5C, a check is made to see if the candidate drive port is already selected, and this comparison produces a signal indicating the port is currently active. The candidate drive port is used later in conjunction with a plurality of bits indicating the status of drives.

Furthermore, in this phase other conditions are checked that could potentially cause a conflict. If a local opcode validation is being performed on a drive port on the same port candidate as a remote opcode validation cycle that started just prior to the current opcode validation cycle, then this command might be "punted". This check generates the signal indicating a potential pipeline conflict which is used later in the punt calculation.

Finally, a signal indicating this port is coupled to this standard interface chip is generated which indicates whether the candidate port refers to any of the ports that are controlled by this standard interface chip.

Also, the opcode command word 184, the sector number byte 186, and the port candidate number 188 of the command longword 178 are moved to a set of pipeline registers to prevent them from being overwritten by the next opcode validation cycle.

By Phase 5, one complete bus clock cycle has elapsed from the time the port candidate was available on the internal DBUS 170. The drive status information of the selected port has been gathered by the state path section 164 of the standard interface chip and is available for latching in phase 5.

In Phase 6, shown in FIG. 5D, the value of the local PUNT signal is calculated, whose asserted state means that this particular standard interface chip will pull down the PUNT line in order to reject this command.

The local PUNT signal is asserted if any of the following conditions is true:

1. The opcode is invalid as determined earlier by examining the opcode validate bit.

2. A combined PUNT signal is a signal that is active low. It carries the combined vote of both standard interface chips. Essentially, if there is a potential conflict with the opcode validation cycle that is one bus cycle ahead of the current one, and if that one appears to be successful (PUNT not pulled low), then this opcode validation cycle should punt in order to avoid the conflict.

3. Bit 2 of the opcode command word 184 (OPCODE <2>) is set for all data transfer commands which must be executed at a specific sector position. The PUNT signal is generated if OPCODE <2> is set and the drive is not located thereon.

4. Transfer commands also require a sync bit to be asserted, unless the port is already active. The sync bit indicates that there remains adequate time for the state machine to command the drive to perform work on the next disk sector if it is the sector indicated by the command longword. The sync bit is set whenever a sector pulse indicates that the pickup head is at the beginning of a sector. The sync bit remains active for one-hundred ninety-two microseconds, after which the sync bit is deasserted, indicating that the pickup head is too close to the beginning of the next sector to initiate the command requested.

5. Bit 1 of the opcode 184 (OPCODE <1>) is set for all commands requiring the drive to be ready for a sector read or write operation.

6. Bit 0 of the opcode 184 (OPCODE <0>) is set for all commands requiring that a drive is ready to receive a command and the drive clock is present.

In Phase 7, shown on FIG. 5E, the logic begins driving the Punt signal.

In Phase 8, the Port Candidate Signals are registered to the next stage of the pipeline to again prevent being overwritten.

In Phase 9, the combined PUNT signal of both the standard interface chips should be stable by the end of this phase, and the combined PUNT signal's value is captured in a latch and fed back to phase six of the opcode validation pipeline to be used by subsequent opcode validation processes.

Phase 10 represents the end of the Opcode Validation pipeline. If the latched value of the combined PUNT signal of both the standard interface chips is deasserted, meaning neither of the standard interface chips objected to the command, the value of the selected port is moved to either the local or remote candidate registers as appropriate so the port selection process can begin. The port selection process will be subsequently initiated only upon the absence of the PUNT signal going active.

The foregoing description of the invention has been presented for purposes of illustration and description. It is not intended to limit the invention to the precise forms disclosed, and many modifications and variations are possible in light of the above teachings.

What is claimed is:

1. A method for distributing information in a computer system having a controller and a plurality of data storage devices, said controller including an internal communications bus, a first validator and a second validator for validating a transferral of information through said controller to said storage devices, a first plurality of drive ports coupled through a first interface to said first validator, and a second plurality of drive ports coupled through a second interface to said second validator, said method comprising an steps of:
   determining to which of said first and second plurality of drive ports that selected information is to be distributed;
   determining to which of said drive ports in said determined plurality of drive ports that said selected information is to be distributed;
   transferring said selected internal communications bus to said determined drive port in said determined plurality of drive ports through one of said validators and interfaces coupled to said determined plurality of drive ports if said determined drive port is available and said interface coupled to said determined drive port is not transferring information to another one of said drive ports in said determined plurality;
   transferring said selected information from said internal communications bus to said determined drive port in said determined plurality of drive ports through one of said interfaces not coupled to said determined plurality of drive ports if said determined drive port is available but said interface coupled to said determined plurality is transferring data to another one of said drive ports in said determined plurality; and
   preventing the occurrence of a condition whereby both of said interfaces are communicating with one of said plurality of drive ports at the same time.

2. The method recited in claim 1, wherein both of said steps of transferring include the steps of:
   signalling between said validators to indicate a transfer of information through said drive ports of each of said respective plurality of drive ports.

3. A multistaged pipeline logic control device for distributing information in a computer system having a controller and a plurality of drive ports connected to a plurality of data storage devices, said controller including an internal communications bus for transmitting information through said controller to a selected one of said plurality of data storage devices, said multistaged pipeline logic control device comprising:
   a first plurality of drive ports, each having an in use and an available status and each connected to a respective one of said plurality of data storage devices;
   a second plurality of drive ports, each having an in use and an available status and each connected to a respective one of said plurality of said data storage devices;
   first interface means coupled to said first plurality of drive ports for directing information to one of said first plurality of drive ports;
   second interface means coupled to said second plurality of drive ports for directing information to one of said second plurality of drive ports;
   first validation means for affirming a transferral of information through said controller to said data storage devices and for monitoring the status of said first plurality of drive ports, said first validation means coupled to said internal communications bus and having a first data line and a second data line, said first data line connected to said first interface means and said second data line connected to said second interface means, said first and second data lines used for transmitting information between said first validation means and said first and second interface means respectively;
   second validation means for affirming a transferral of information through said controller to said data storage devices and for monitoring the status of said second plurality of drive ports, said second validation means coupled to said internal communications bus and having a third data line and a fourth data line, said third data line connected to said second interface means and said fourth data line connected to said first interface means, said third and said fourth data lines used for transmitting information between said second validation means and said second and first interface means respectively; and selected drive port status line means connecting said first validation means to said second validation means for communicating the status of said selected one of said plurality of drive ports between said first and said second validation means, said first and said second validation means operating on said status of said requested drive port to affirm a transferral of information to said selected drive port.

4. A multistaged pipeline logic control device for distributing information in a computer system having a controller and a plurality of drive ports connected to a plurality of data storage device, said controller including an internal communications bus for transmitting information through said controller to a selected one of said plurality of data storage devices, said multistaged pipeline logic control device comprising:

a first plurality of drive ports, each having an in use and an available status and each connected to a respective one of said plurality of data storage devices;

a second plurality of drive ports, each having an in use and an available status each connected to a respective one of said plurality of said data storage devices;

first interface means coupled to said first plurality of drive ports for directing information to one of said first plurality of drive ports;

second interface means coupled to said second plurality of drive ports for directing information to one of said second plurality of drive ports;

two validation means for affirming a transferral of information through said controller to said data storage devices and for monitoring the status of said first and second plurality of drive ports, each of said validation means coupled to said internal communications bus and each of said validation means coupled individually to said first and said second interface means for transmitting information through one of said validation means to a selected one of said first and second interface means.

5. The multistaged pipeline logic control device recited in claim 4, wherein said validators further comprise:

selected drive port status line means connecting said validation means for communicating the status of said selected one of said plurality of drive ports, said validation means operating on said status of said requested drive port to affirm a transmission of information to said selected drive port.

6. A multistaged pipeline logic control device for distributing information in a computer system having a controller and a plurality of drive ports connected to a plurality of data storage devices, said controller including an internal communications bus for transmitting information through said controller to a selected one of said plurality of data storage devices, said multistaged pipeline logic control device comprising:

a plurality of groups of drive ports, each of said drive ports having an in use and an available status and each connected to a respective one of said plurality of data storage devices;

a plurality of interface means, each one of said interface means coupled to one of said groups of drive ports; and a plurality of validation means for affirming a transferral of information through said controller to said data storage devices and for monitoring the status of said drive ports, each one of said validation means coupled to said internal communications bus and to a respective one of said interface means for monitoring the status of said respective group of drive ports coupled to said interface means, and each one of said validation means coupled to each of said interface means for transmitting information through said controller to a selected one of said plurality of interface means.

7. The multistaged pipeline logic control device recited in claim 6, wherein said validation means further comprises:

selected drive port status line means connecting together each of said plurality of validation means, said selected drive port status line means communicating to said validation means the status of said requested drive port to enable said multistaged pipeline logic control device to transmit information to said selected drive port.

8. The multistaged pipeline logic control device recited in claim 7, wherein said validation means further comprises:

a plurality of port select enable line means connecting together each of said plurality of validation mean, said port select enable line means communicating to said validation means when a selected one of said drive ports starts and stops transferring information through one of said selected drive ports.

9. In a computer system having a controller and a plurality of data storage devices, a method for validating a request to transfer information between said controller and an available one of said plurality of storage devices, said controller including a plurality of drive ports, each of said drive ports having an in use and an available status and connected to one of said storage devices and said drive ports divided into a plurality of groups, a plurality of interfaces, each one of said interfaces connected to a respective one of said groups of storage devices, and a plurality of validators for validating a transferral of information through said controller to said available one of said storage devices, each of said validators connected to each of said interfaces, said method comprising the steps of:

requesting one of said drive ports for transferring information to;

selecting one of said validators to validate said request to transfer information;

determining in which of said groups of said plurality of groups of drive ports said requested drive port is contained;

monitoring the status of said requested drive port;

generating a status signal indicating said status of said requested drive port in response to said monitoring of said requested drive port; and validating the request to transfer information to said selected drive port in response to said status signal and upon operation of said selected validator if said status signal indicates said requested drive port is available.

10. The method recited in claim 9, wherein said step of generating a status signal comprises the step of:

generating an indication signal indicating adequate time remains for transferring information between said controller and said available one of said plurality of storage devices.

* * * * *